No. 633,361. Patented Sept. 19, 1899.
G. HIPWOOD.
CAR FENDER.
(Application filed Apr. 10, 1899.)
(No Model.) 3 Sheets—Sheet 1.

WITNESSES:
A. N. Bonney.
A. G. Bonney.

INVENTOR
George Hipwood
By his Atty
Henry W. Williams

No. 633,361. Patented Sept. 19, 1899.
G. HIPWOOD.
CAR FENDER.
(Application filed Apr. 10, 1899.)
(No Model.) 3 Sheets—Sheet 2.

WITNESSES:
A. N. Bonney.
A. J. Bonney.

INVENTOR:
George Hipwood,
By his Atty
Henry W. Williams

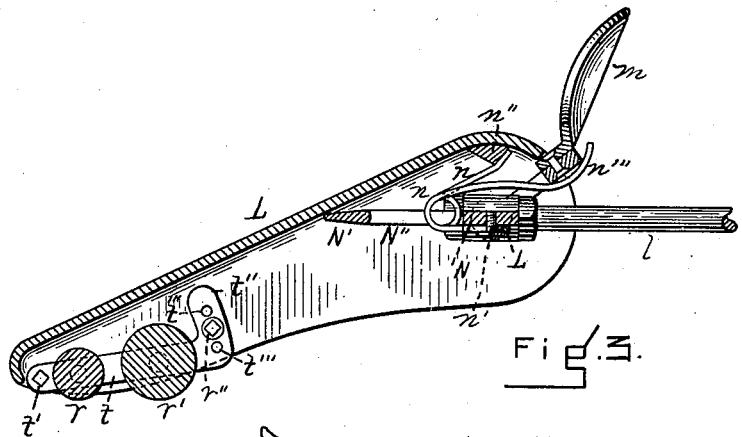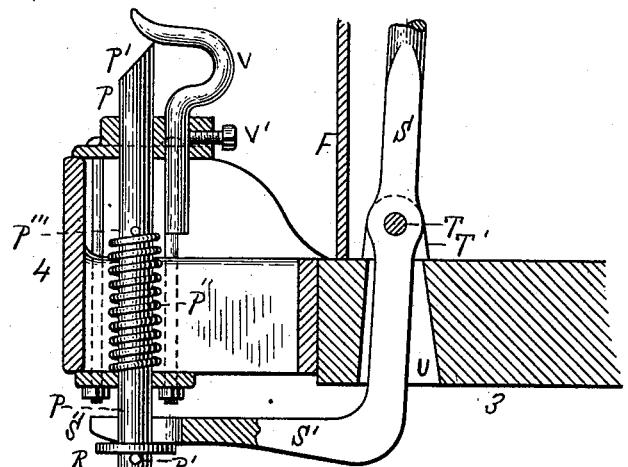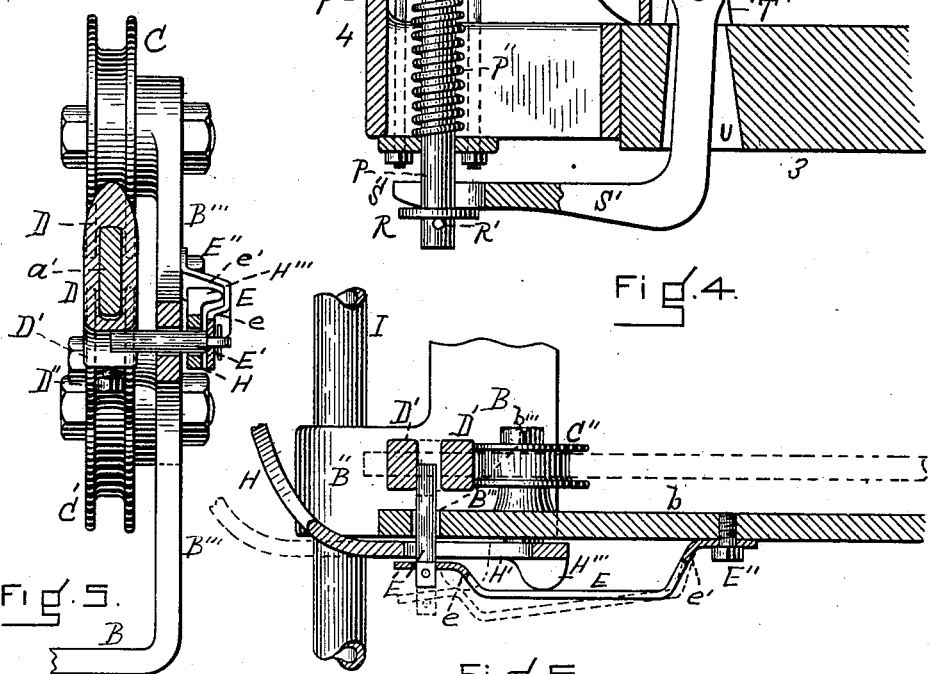

UNITED STATES PATENT OFFICE.

GEORGE HIPWOOD, OF BOSTON, MASSACHUSETTS.

CAR-FENDER.

SPECIFICATION forming part of Letters Patent No. 633,361, dated September 19, 1899.

Application filed April 10, 1899. Serial No. 712,353. (No model.)

*To all whom it may concern:*

Be it known that I, GEORGE HIPWOOD, a citizen of the United States, residing in Boston, in the county of Suffolk and State of Massachusetts, have invented certain new and useful Improvements in Car - Fenders, of which the following is a specification.

This invention relates to car-fenders adapted particularly for use on street-cars propelled by electricity, cable, or other power; and it relates more especially to the general style or class of fender illustrated and described in Letters Patent of the United States granted October 31, 1893, and numbered 507,655, granted April 13, 1897, and numbered 580,549, and granted January 4, 1898, and numbered 596,592, to which reference is made. My present invention is intended to be an improvement over and upon the inventions described in said Letters Patent; and it relates to the construction and arrangement of the connections between the fender proper and the car-body whereby the supports for the fender are secured to the inner sides of the sills, thus enabling the fender in its horizontal movements to clear all possible equipments of the car, and other results are attained, the rail supported by the hangers and on which the bars extending up from the fender move being adjustable as to height; an improved contrivance whereby the fender is automatically locked and prevented from longitudinal movement when the bunter-guard or dashboard-protector is up and automatically unlocked when the bunter-guard is down, so that the fender can be slid under the car; an improved mechanism for holding the front edge of the fender down upon the ground when the fender is released by the motorman; an improved arrangement for locking the fender in a position slightly raised from the ground and for releasing the same, and other combinations and arrangements of mechanism, all as fully described below and illustrated in the accompanying drawings, in which—

Figure 1:
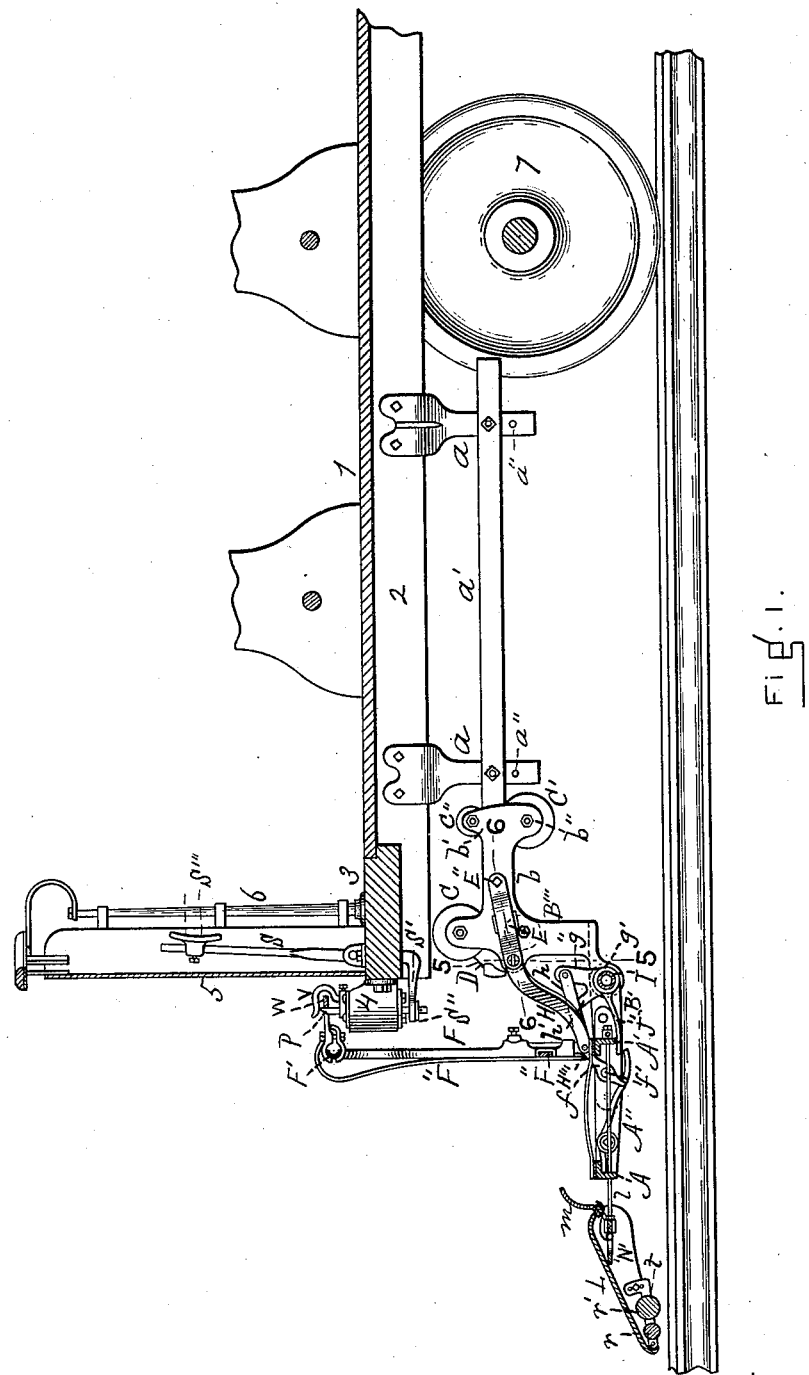
Figure 2:
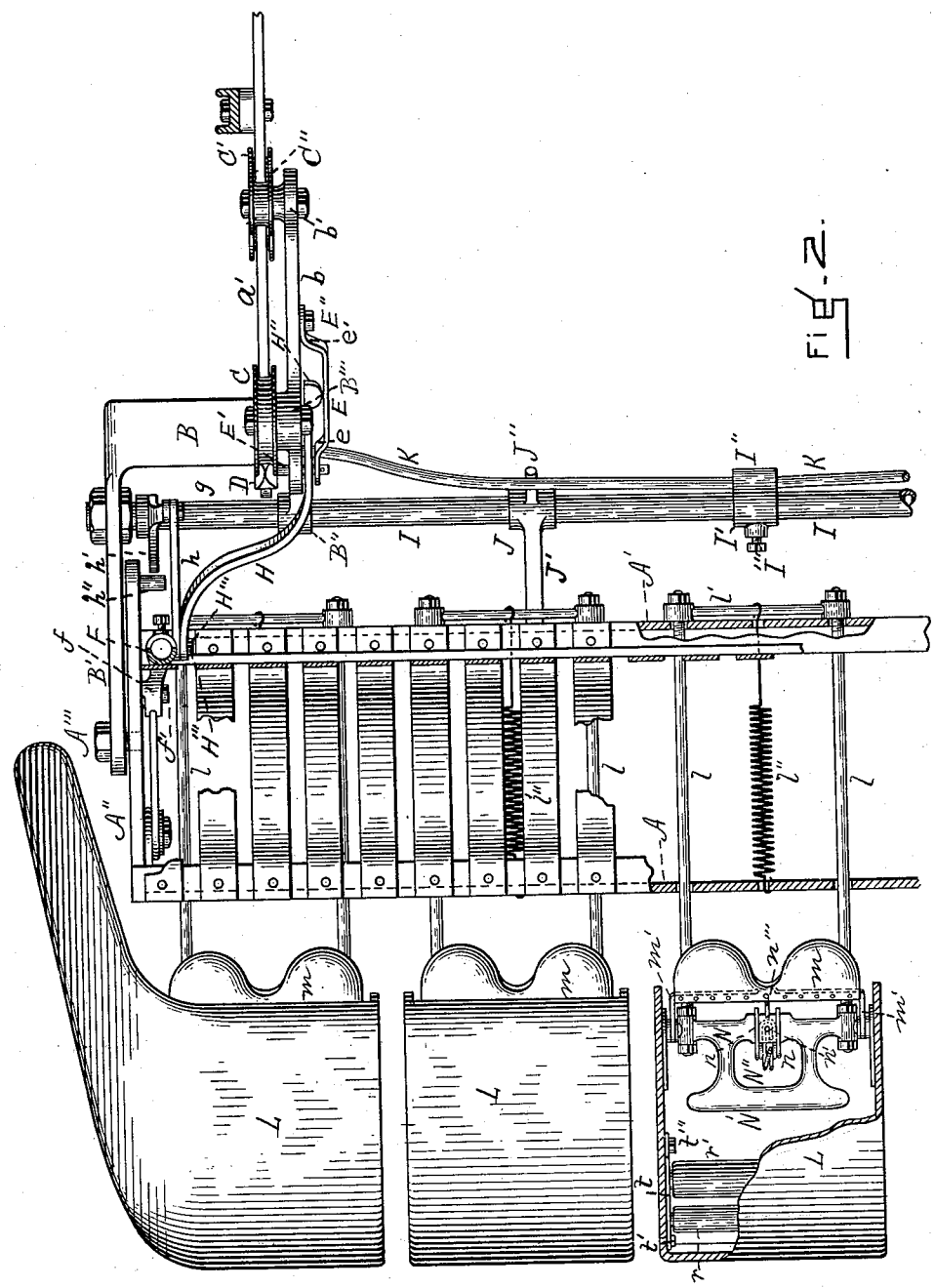

Figure 1 is a longitudinal vertical section of my improved fender applied to a car, a portion of the body of which is shown. Fig. 2 is an enlarged plan of a portion of the fender, a part of one of the shoes and other parts of the fender being represented as broken out. Fig. 3 is an enlarged longitudinal vertical section of one of the shoes. Fig. 4 is a detail in longitudinal vertical section and elevation, illustrating the releasing mechanism. Fig. 5 is a sectional detail taken on line 5, Fig. 1. Fig. 6 is a sectional detail taken on line 6, Fig. 1.

Similar letters and numerals of reference indicate corresponding parts.

In the drawings the fender is shown in its normal position—that is to say, with its front edge slightly raised from the track.

1 represents a portion of the car-body, 2 the sills, 3 the platform, 4 the bunter, 5 the dashboard, 6 the end posts for the same, and 7 the wheels, all constructed as usual.

$a\ a$ represent vertical hangers bolted to the inner sides of the sills 2 on opposite sides of the car-body. To each pair of these hangers is secured horizontally a rail $a'$.

A A' represent the horizontal parallel front and rear bars, and A'' the end bars, constituting the rectangular frame of the fender proper, said frame being pivotally secured at A''' to and tilting with relation to the forward ends of the portions B' of frames intermediate between the fender and the rails $a'$, which are adapted to move horizontally under the car. Each of these frames consists of the main central horizontal portion B, extending parallel with the rear bar A' of the fender, the forwardly-extending arm B', the parallel shorter arm B'', the vertical portion B''', and the rearwardly-extending horizontal portion $b$, from whose rear end extend upward and downward, respectively, the portions $b'\ b''$. (See Figs. 1, 2, 5, and 6.) All the parts of these intermediate frames, with the exception of the arms B' and B'', are underneath the car-body or platform thereof. Mounted on a stud extending horizontally outward from the upper end of the portion B''' of each of said frames or brackets is a grooved wheel C, which rests on the upper surface or edge of the track $a'$ on that side, and mounted on a stud extending from the outer side of the portion B'' is a similar wheel C', which is in contact with the under side of the rail $a'$. (See Figs. 1 and 5.) Similarly mounted and supported by the portions B''' and $b'$ of the frame, opposite the wheels C and C'—that is to say, below and above them, respectively, and bearing on the opposite sides of the rail $a'$—are small rollers $C''$, so that the weight of the fender, supported by the intermediate frames, bears against the large wheels C and C', while the small rollers $C''$ are merely anti-friction-rollers, sustaining little pressure.

On each of the rails $a$, near its forward end, is a structure D, Fig. 5, which has a central opening, whereby it surrounds and is enabled to slide on the rail. This slide is provided on its under side with downwardly-extending projections $D'$, Figs. 5 and 6. Set-screws $D''$ extend up through the portions $D'$ against the under side of the rail and hold the slide in the desired position thereon. A spring E has its rear end secured at $E''$ to the portion $b$ of the intermediate frame and extends forward, as shown in Figs. 2 and 6, and is provided at its forward or free end with a bolt $E'$. This spring is bent inward, as shown at $e$ and $e'$, so that the main portion of the spring is substantially parallel with the part $b$ and at quite a distance therefrom. The frame of the bunter-guard comprises the end bars F, upper bar $F'$, and lower bar $F''$, which support the springs $F'''$, the construction of the same not being new in this invention. These end bars F are formed at their lower ends with feet $f$, which are pivoted at $f'$ to the side bars $A''$ of the main portion of the fender. (See Figs. 1 and 2.)

H H are bars whose outer ends are pivotally secured at $H''''$ to the inner sides of the lower portions of the bars F. These bars H curve inwardly, as shown in Fig. 2, and upwardly, as shown in Fig. 1, and their rear ends are provided with the longitudinal slots $H'$, as indicated in Fig. 6. Moreover, the rear end of each said bar H is formed with an inwardly and horizontally projecting lip $H''$. When the fender is extended into position for use and the bunter-guard is raised, as shown in Fig. 1, the bolts $E'$ extend from the forward portions of the springs E through the slots $H'$, openings $b'''$ in the portions $b$, and into the notches or recesses formed by the downwardly-extending projections $D'$. Thus the fender is locked so that it cannot be pushed back under the car. When it is desired to fold the fender and push it under the car, the bunter-guard is swung down, with the effect that the pivots $H'''$ pull forward the curved bars H, such movement being allowed by the slots $H'$ therein until the lips $H''$ reach the bends $e$ in the springs E and force the forward ends of the springs inward into the position indicated by dotted lines in Fig. 6. This withdraws the bolts from between the projections $D'$, but not from the openings $b'''$ or slots $H'$, and the entire fender can be pushed back under the car, the wheels C and $C'$ running on the rails $a'$. Thus the fender is locked or unlocked automatically as the bunter-guard is swung up or down.

I is a horizontal rod, preferably tubular, extending through suitable openings in the arms $B''$ and rigidly secured at its opposite ends to the arms $B'$, Figs. 2 and 6. $I'$ is a collar centrally secured adjustably to this rod by means of a set-screw $I'''$ and provided with a horizontally-bored rearward extension $I''$. J J are two hubs or sleeves on said rod I, but not rigidly secured thereto, each of which is provided with a pawl $J'$, which extends forward under the rear bar $A'$ of the main portion of the fender. These hubs or sleeves are located between the collar $I'$ and the portions $B'$ of the frames B, and each is, furthermore, provided with a rearwardly and upwardly extending hook $J''$. (See Fig. 2.) A spring K extends through the bore in the extension $I''$ of the collar $I'$ and through the hooked portions $J''$, and the opposite ends of said spring lie under the arms $B''$. When the bunter-guard is swung up and is locked into position in the manner described below, this spring K by bearing down upon the hooks $J''$ (each of which really constitutes the short arm of a lever of which $J'$ is the long arm) hold up the rear portion of the body of the fender, and hence lower the front portion. When, however, the bunter-guard is folded down upon the main portion of the fender, the rear bar $A'$ of said portion is forced down against the power of the pawls $J'$ and spring K by means of a contrivance (not new in this invention) at each end of the fender, such contrivance consisting of a sleeve $g$ on the bar I between the arms $B'$ and $B''$, a hub $g'$, fast on said sleeve, an arm $g''$, integral with said hub and connected at its outer end by a link $h$ with the pivot $H'''$, to which the forward end of the arm H is connected, and a horn or cam $h'$, whose outer end is adapted to engage the pin $h''$, extending inwardly from the rearward extensions $A''''$ of the end bars $A''$. (See Figs. 1 and 2.) It is evident that when the bunter-guard is lowered the links $h$ pull forward the arms $g''$, and hence swing down the cams or horns $h'$, which bear upon the pins $h''$ and lower the rear portion of the fender proper, raising of course the forward portion. Additional openings $a''$ in the hangers $a$ render the rail $a'$ adjustable as to height in order that the fender may be adapted to different conditions and styles of cars.

The shoes L tilt on the horizontal bars $L'$, Figs. 1 and 3, each of said bars being supported by a pair of horizontal rods $l$, which are supported by and slide in the bars A and $A'$ of the fender proper and are connected at their rear ends by a rod $l'$. A spiral spring $l''$ extends centrally between the pair of rods $l$ and has its ends secured to the bar $A'$ and the connecting-rod $l'$, and thus holds the shoe normally forward. The forward ends of each pair of rods $l$ support a substantially horizontal frame, which consists of the main portion N and the extension $N'$, said main portion directly connecting and being supported by the rods $l$, the whole being provided with an opening $N''$ and the extension holding up the forward end of the shoe. A double spring $n$ has its central portion secured to a suitable pin or bolt $n'$, Figs. 2 and 3, and its ends bear against a block or protuberance $n''$, Fig. 3, secured transversely and horizontally to the under side of the rear portion of the shoe L. Between the two portions of the doubly-coiled spring $n$ a single spring $n'''$ lies, the forward end of said spring being secured to the pin or bolt $n'$ and the rear end extending beyond the shoe and up against the under or rear side of the wing $m$, which is secured to a frame $m'$, pivotally attached at $m''$ to the sides of the shoe. (See Figs. 2 and 3.) The springs $n$ hold the rear ends of the shoes up and hence the forward ends normally down as far as the extensions N' allow, and the springs $n'''$ hold the wings $m$ normally up, and when a body falls upon the fender the wings are pressed down by said body and bridge the space between the shoes and the fender proper, and if the body rolls onto the fender proper the wings return to their normal position and act as stops to prevent it from rolling forward onto the shoes. The opposite ends of the rolls $r\ r'$ (not new in this invention) have their bearings in swinging bars $t$, whose forward ends are pivotally secured at $t'$ to the sides of the shoes L and whose rear ends are formed up into the portions $t''$, provided with series of perforations $t'''$, whereby said rear ends may be adjustably secured as to height by means of bolts $r''$ to the sides of the shoes, thus enabling the rollers to be lifted in case the road-bed is unusually rough. (See Fig. 3.)

In applying a mechanism to the car for locking the bunter-guard in a raised position and releasing it in case of an impending accident for the purpose of dropping the forward edge of the fender to the ground it has been found advisable to devise a contrivance which can be applied and operated without perforating the dashboard. My improved mechanism for this purpose is illustrated in Figs. 1 and 4. The bunter is perforated or bored vertically to receive the vertically-moving bolt P, beveled at its upper end, as indicated at P', and provided with a spiral spring P'', which is confined between the floor of the bunter and a pin P''', extending from the bolt. The lower portion of the bolt is provided with a washer or flange R, supported by a suitable pin R'. A lever S, furnished at its upper portion with a suitable knee-pad S''', is pivoted at T to ears T', secured to the platform, and extends from behind the dashboard down through the opening U in the platform, said opening being larger at its lower end in order to allow for the swing of the lever, and said lever has its forward end S' bent forward and bifurcated at S'' to embrace the bolt P above the washer R. Directly behind the bolt P a hook V is inserted vertically in the bunter and held adjustably therein by means of the set-screw V'. A ring or loop W, Fig. 1, is secured centrally to the bar F' and extends rearwardly therefrom. After the fender has been drawn out in position for use the bunter-guard is swung up until its ring or loop W slips over the yielding bolt P and is locked within the hook V. In case of impending accident or if the bunter-guard is to be swung down the bolt P is lowered by the pressure of the knee of the motorman against the pad S'.

Having thus fully described my invention, what I claim, and desire to secure by Letters Patent, is—

1. In a fender, supports adapted to be secured to and extend down from the inner sides of the sills of a car; substantially horizontal rails sustained in a stationary position by said supports on opposite sides under the car; a fender-frame; and frames or carriages as B intermediate between said supports and the fender-frame provided with wheels or rollers adapted to run on the upper and lower edges of the rails, said frames or carriages extending from said rails downward and outward and provided with forwardly-extending arms pivotally connected with the end bars of the fender-frame, substantially as described.

2. In a fender, supports adapted to be secured to and extend down from the inner sides of the sills of a car; substantially horizontal rails sustained in a stationary position by said supports on opposite sides under the car; the frames or carriages running on said rails and each consisting of the horizontal portion $b$ provided with the extensions $b'$, $b''$, the downwardly-extending portions B''', the outwardly-extending horizontal portions B and the forwardly-extending arms B', B''; the fender-frame pivotally secured to and between said arms B'; and the rod I supported by said arms, substantially as set forth.

3. In a fender, supports adapted to be secured to and extend down from a car-body; the rails $a'$ sustained by said supports; the slides D each formed on its lower side with a recess or socket; the frames or carriages running on said side rails and pivotally supporting the fender, each said frame or carriage being provided with the hole $b'''$; the springs E secured at their rear ends to the frames or carriages, bent centrally inward from said frames or carriages and provided at their forward ends with the bolts E' extending through said holes and normally into said recesses; the main fender-frame; the bunter-guard pivotally secured to and swinging up from said fender-frame; and the bars H pivotally secured at their forward ends to the frame of the bunter-guard, provided with slots H' through which said bolts extend, and at their rear ends with the inwardly-projecting lips H'' for engagement with said spring, substantially as described.

4. In a fender of the character described, carriages adapted to be supported and run on rails under the car-body and provided with the downward extensions B''' and forwardly-extending arms B', B''; the horizontal rod or shaft I supported by said arms; the fender-frame pivotally sustained between the outer ends of the arms B'; the pawls or levers J, J' mounted on said rod I and provided with the rearwardly-extending arms or hooks J", the portions J' of said pawls or levers extending under the rear edge of the fender-frame; the collar I' rigidly secured centrally to the rod I; and the spring K extending from said collar outwardly through or into engagement with the hooks or arms J" and under the arms B", substantially as and for the purpose set forth.

5. In a fender, the substantially horizontal fender-frame; the shoes L supported thereby and sliding horizontally with relation thereto; the pairs of swinging bars $t$ pivotally secured at their forward ends to the inner surfaces of the sides of the shoes and formed at their rear ends with the upwardly-extending portions $t''$ each provided with a series of perforations; means for attaching said rear ends to the sides of the shoes and swinging or adjusting them vertically with relation thereto; and the rollers $r, r'$ supported by said bars $t$, substantially as described.

6. In a fender of the character described, the fender-frame; the shoes L; the rods $l$ extending from the fender-frame and pivotally supporting said shoes in front of the frame; the wings $m$ pivotally secured to the shoes and extending upward and rearward therefrom; the frames N provided with the central openings N" and with the extensions N' bearing against the under sides of the shoes, said frames being supported by the rods $l$; the springs $n$ extending from the under sides of said frames through said openings and bearing against the under surfaces of the shoes; and the springs $n'''$ extending from the under sides of said frames and with the rear ends bearing against the under sides of the wings, substantially as set forth.

7. In a fender comprising a substantially horizontal fender-frame and a substantially vertical bunter-guard hinged to and extending up from said fender-frame, in combination, the bunter-guard; the platform, dashboard and bunter 4 of a car, the bolt P extending up through the bunter and held normally up by a spring; the hook V held rigidly in the bunter in relation with said bolt; and the lever S, S' extending from above the platform behind the dashboard down through the platform, under the dashboard and in engagement with said bolt, said bunter-guard being provided with a suitable device for engaging with the bolt, substantially as and for the purpose set forth.

GEORGE HIPWOOD.

Witnesses:
HENRY W. WILLIAMS,
A. N. BONNEY.